Sept. 9, 1924.
M. E. ROE
CASTER
Filed Dec. 16, 1921
1,507,756
3 Sheets-Sheet 1
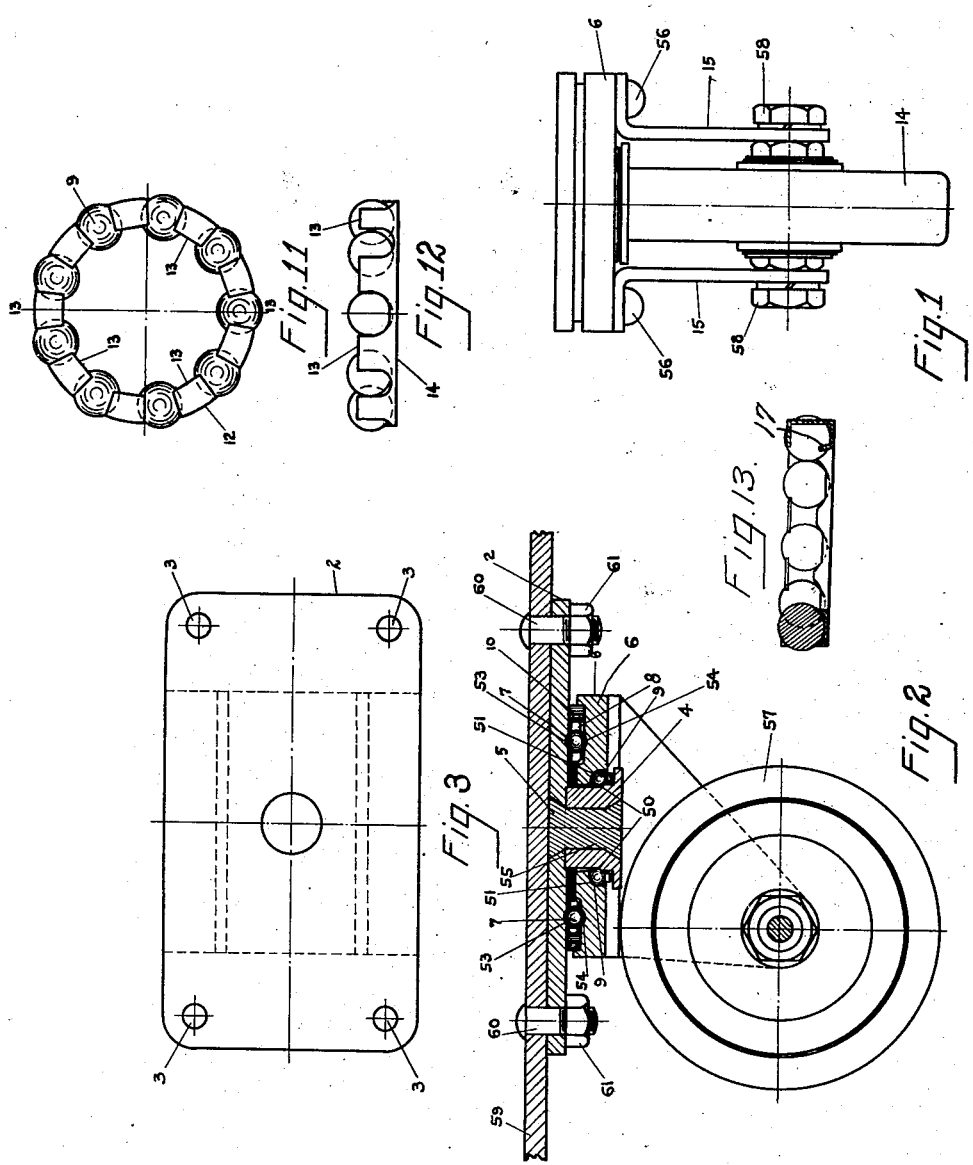
Inventor.
Mayo. E. Roe
By Richey Slough + Watts,
His Attorneys Sept. 9, 1924.

M. E. ROE

CASTER

Filed Dec. 16, 1921

MAYO E. ROE  INVENTOR.

BY *Richey Slough & Tate*

HIS ATTORNEYS

Sept. 9, 1924.
M. E. ROE
CASTER
Filed Dec. 16, 1921      3 Sheets-Sheet 3
1,507,756
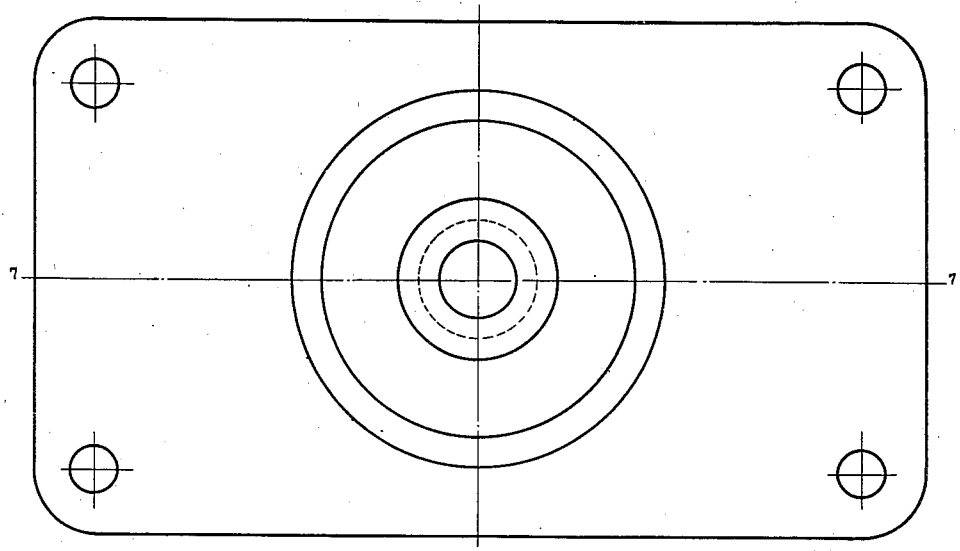
Fig. 6
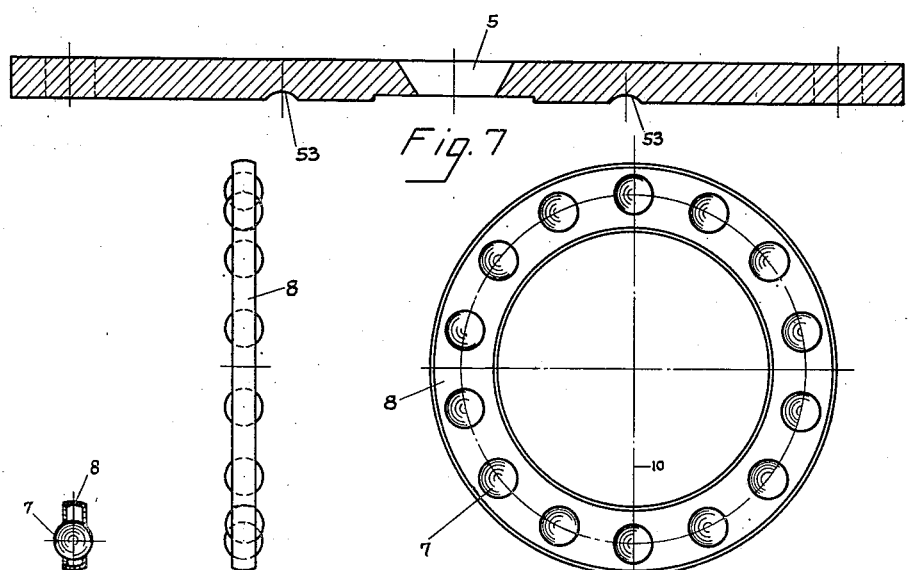
Fig. 7
Fig. 10   Fig. 9   Fig. 8
MAYO E. ROE   INVENTOR.
BY Richey Singh & Tales
HIS ATTORNEYS Patented Sept. 9, 1924.

1,507,756

UNITED STATES PATENT OFFICE.

MAYO E. ROE, OF ELYRIA, OHIO, ASSIGNOR TO THE COLSON COMPANY, OF ELYRIA, OHIO, A CORPORATION OF OHIO.

CASTER.

Application filed December 16, 1921. Serial No. 522,828.

*To all whom it may concern:*

Be it known that I, MAYO E. ROE, a citizen of the United States, residing in Elyria, in the county of Lorain and State of Ohio, have invented certain new and useful Improvements in Casters; and I do hereby declare the following to be a full, clear, concise, and exact description of the invention, such as will enable others skilled in the art to which it appertains to make and use the same.

My invention relates to casters, more particularly it relates to an improved form of ball bearing caster.

Among the objects of my invention are:—

To provide a caster of steel throughout;

To provide a caster in which the ball bearings may be held within retainers; and in which a space is provided for packing grease;

To provide in a caster of the above character a retaining washer of felt or other suitable material to prevent the accumulation of dust in the ball bearing region, or to prevent the lubricant from working out; and To provide other details of improvement tending to increase the efficiency and serviceability of a caster of the above character.

To accomplish the foregoing and other useful ends, my invention comprises means hereinafter more fully set forth and claimed.

Referring to the accompanying drawings in general.

Fig. 1 shows the caster in front elevation.

Fig. 2 shows the same in sectional side elevation.

Fig. 3 is a top view of the same.

Fig. 6 is a bottom view of the caster block which is immediately secured to the furniture or other device to which the caster is attached.

Fig. 7 is a section on line 7—7, Fig. 6.

Fig. 8 is a top view of the ball retainer for the upper ball bearing.

Fig. 9 is an end view thereof.

Fig. 10 is a section through line 10—10, of Fig. 8, showing one of the ball bearings.

Figs. 11 and 12 are respectively top and elevational views of the ball bearing means for the under side of the caster race plate.

Figure 13 shows a transverse section taken on line 13—13 of the assembled bearing of Fig. 11.

Figure 5:
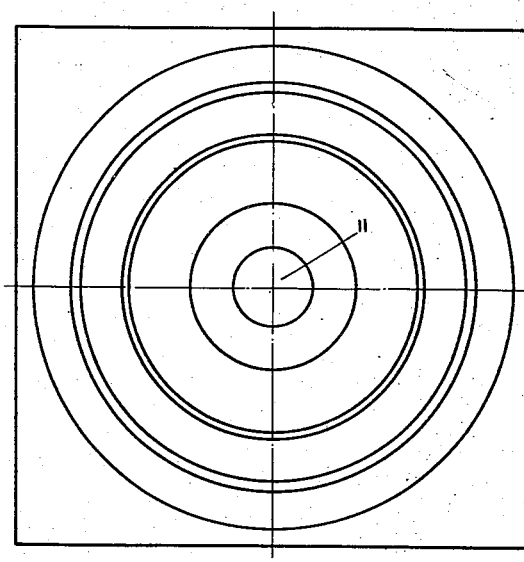
Fig. 5 is a bottom view of the race plate.
Figure 4:
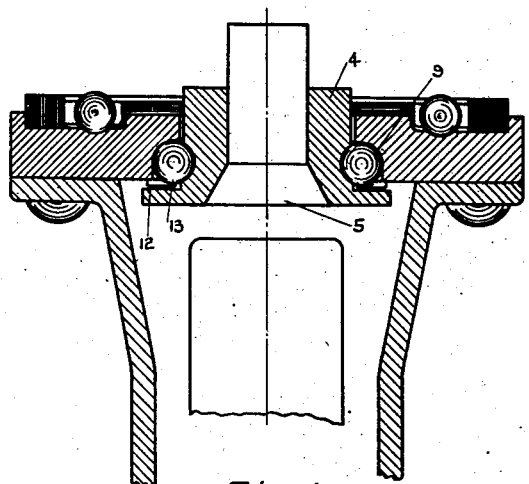
Fig. 4 is a partial section in elevation of the caster with the caster block removed.

Referring more in detail to the drawings and particularly to Fig. 2, the top plate, 2, is secured through the holes, 3, by means of suitable screws or bolts to whatever device the caster is to be applied. The cone, 4, is secured to the plate, 2, through the medium of any suitable means such as a rivet, 55, as will be later described. The bolt then serves to hold the caster bearing in position and assembled as shown in Fig. 1.

The details of construction of the ball retainer, 12, are shown in Figs. 11 and 12. In the retainer, 12, the balls project beyond the retainer above as shown in Fig. 12, on the inside as shown in Fig. 11, and on the outside as shown in both figures. Above and without the retainer, 12, the balls engage with the race plate, 6, and on the inside lower portion of the retainer, the balls engage with a peripheral race groove, 16, on the cone 4. The separating prongs, 13, are folded upwardly, then back inwardly in a radial direction as indicated in Fig. 11, the upper surfaces of the flanges, 13, falling definitely below a horizontal plane, Fig. 12, tangent to all of the balls. From the lower surface, 14, of the retainer, and along the inner border corresponding prongs, 17, project upwardly there being one such prong, 17, opposite each prong, 13. Consequently, the lower prongs are in juxtaposition to the upper prongs, 13. In my preferred construction, the upper prongs and the lower prongs do not come in contact along the inner circumference of the retainer. It will be seen, therefore, that the balls, 9, are retained in position between the lower face, 14, and upper adjoining prong sets, comprising upper and lower prongs.

In this way the bearing balls are held in position between the different prong sets and project from the retainer at the upward outward portion and the inner lower portion, so that the balls, 9, may engage with the races, 50 and 51, being held there between.

Referring now more particularly to Figs. 2, 3, and 6 to 10 inclusive, the upper set of bearings is shown in these figures together with the co-operating races in which the bearings are placed, and the bearing ball retainer, 8, which holds the bearing balls. This retainer, 8, is preferably constructed as shown in Figs. 8 to 10 inclusive, by taking two annular steel stampings which are trough shaped in vertical cross section and which have corresponding circular openings provided at the intermediate trough portions and pressing them together so as to make a hollow annular ring, the balls being placed between the two component annular trough portions before pressing them together so that each ball occupies a space within the hollow annular ring and projects through the openings provided on either side and which openings are of insufficient diameter to permit the egress of the bearing balls. Thus the balls are loosely held in the bearing retainer being free to revolve therein. Although, I prefer this construction involving retainers, it will be seen that in my improved caster construction, these may be omitted if desired.

The assembled bearing, comprising retainer and balls, is then placed between the caster block, Figs. 6 and 7, and the race plate, Fig. 5, as shown in Fig. 2, the balls, 7, contacting with the grooved races 53 and 54.

I find that by providing grooved races on both the upper block and lower plate, a smoother working and more durable bearing is secured, and less wear is had in both races, and the wear is more uniform all around the races.

Riveted to the race plate, 6, at 56 are side fork members, 15, which carry the caster wheel, 14, this caster wheel being preferably supplied with a rubber tire, 57, and containing anti-friction bearings within its hub.

Securing nuts, 56, secure the wheel, 14, in place between the fork members, 15.

The caster wheel is rotatably secured to the top plate, 2, by means of rivet, 55, which clamps the cone member, 4, to the plate, 2, and at the same time secures together the intermediate bearings which comprise bearing balls, 7 and 9, and the lubricant retaining felt annular ring, 10, these all being secured in one unitary structure by the rivet, 55, and the entire caster can be secured to the bottom, 59, of the vehicle by suitable bolts, 60, and nuts, 61.

It will be noted that on the under face of the plate 2 and concentric with the central opening thereof 5, Fig. 7, I have provided a recess into which the upper end of the cone 4 is adapted to snugly fit when the cone 4 is rigidly secured to the plate 2 by suitable securing means such as the bolt or the rivet 55; the upper end of the cone 4 fits snugly into this recess, and prevents lateral displacement of the cone by laterally acting stresses, and consequently contributes greatly to the durability and serviceability of the wheel supporting structure.

By this construction an inexpensive flat steel upper block is capable of use, and at the same time the bearing is rendered dust proof and tight to the lubricant. Retainers for bearing balls may be packed with oil, grease or other lubricants. With this construction, the wheel, 14, may swivel about a vertical axis with ease and efficiency.

I contemplate constructing every metallic part of the caster of steel, hardened when required, and thus insure durability and economy in construction.

It will be seen, of course, that the balls, 7, receive principally the direct load while balls, 9, receive in addition, any lateral thrusts.

Having thus described my invention as applied in a specific embodiment, I claim:—

1. In a caster, a caster wheel, an inverted approximately U-shaped fork having an upper intermediate plate portion and prongs depending therefrom, a wheel axle, said axle being horizontally disposed between the fork prongs and secured thereto, said wheel being mounted on the said axle for rotation, an annular grooved bearing race in the upper surface of the said intermediate plate portion, a supporting block disposed over the said plate portion, an annular bearing race groove on the under side of the said block and in alignment directly over the first named race groove, bearing balls placed between the races, said block and said plate having centrally disposed aligned openings, that through the said block being of the least diameter, an annular bearing cone inserted through the opening in the said plate and having its inner opening in vertical alignment with the said block central opening, an outwardly extending flange on the lower end of the said cone, a circumferential bearing race groove on the outer surface of the cone near its lower end and above the said flange, an opposing race groove on the lower inner edge of the said plate opening, bearing balls between the said last named races, and bolt means passing through the said block and inner cone openings adapted to rigidly secure the said cone and block together, a recess on the under face of the said plate and concentric with the central opening therethrough, the upper end of the said cone fitting snugly into the said recess to prevent lateral displacement of the cone.

2. A swivel caster comprising a top plate, means to attach the top plate to a vehicle, said top plate being formed with a centrally disposed aperture, a wheel yoke formed with a horizontal portion and depending wheel carrying flanges, and having an annular ball race in its horizontal portion, bearing balls carried by said race adapted to contact with the under surface of said top plate, said under surface being grooved to form an annular race above the annular race of the said wheel carrying member top, said wheel yoke being formed with a central circular opening and with a horizontally inwardly projecting flange at the margin of said opening, a cone member of substantially cylindrical form having an axial hole by which it is adapted to be riveted to said top plate, said retaining member being formed at its bottom with a horizontal outwardly projecting flange beneath the flange of said wheel carrying member, bearing balls mounted between said flanges, said top plate aperture being tapered, the hole being of largest diameter at the top plate upper surface, said axial hole for the said yoke member being enlarged at its lower end, its upper end being substantially cylindrical and of substantially the same diameter as the lower end of the top plate hole to accommodate a rivet passing through the said axial holes and adapted to have its ends riveted over to securely clamp said top plate and retaining member together whereby the said wheel carrying member top plate is rotatably secured to the underside of the said top plate, said top plate having a centrally disposed recess on its lower side, the upper end of the cone fitting snugly into the said recess.

3. In a caster, a caster wheel, an inverted approximately U-shaped fork having an upper intermediate plate portion and prongs depending therefrom, a wheel axle, said axle being horizontally disposed between the fork prongs and secured thereto, said wheel being mounted on the said axle for rotation, a supporting block disposed over the plate portion said block and said plate having opposing face portions in vertical alignment forming bearing races, one of said races being a grooved race, bearing balls placed between the races, said block and said plate having centrally disposed aligned openings, that through the said block being of the least diameter, an annular bearing cone inserted through the opening in the said plate and having its inner opening in vertical alignment with the said block central opening, an outwardly extending flange on the lower end of the said cone, a circumferential bearing race groove on the outer surface of the cone near its lower end and above the said flange, an opposing race groove on the lower inner edge of the said plate opening, bearing balls between the said last named races, and bolt means passing through the said block and inner cone openings adapted to rigidly secure the said cone and block together, a recess on the under face of the said plate and concentric with the central opening therethrough, the upper end of the said cone fitting snugly into the said recess to prevent lateral displacement of the cone.

In witness whereof, I have hereunto signed my name this 12th day of December, 1921.

MAYO E. ROE.